(12) United States Patent
Ohlsson

(10) Patent No.: US 6,717,830 B2
(45) Date of Patent: Apr. 6, 2004

(54) MOS CIRCUIT FOR LOWERING FORWARD VOLTAGE OF DIODES

(75) Inventor: Tony Ohlsson, Johannestrov (SE)

(73) Assignee: Zarlink Semiconductor AB, Jarfalla (SE)

( * ) Notice: Subject to any disclaimer, the term of this patent is extended or adjusted under 35 U.S.C. 154(b) by 140 days.

(21) Appl. No.: 10/060,491

(22) Filed: Jan. 30, 2002

(65) Prior Publication Data
US 2002/0118557 A1 Aug. 29, 2002

(30) Foreign Application Priority Data
Feb. 16, 2001 (GB) ............................................. 0103859

(51) Int. Cl.[7] ............................................. H02M 3/24
(52) U.S. Cl. ......................... 363/77; 363/123; 363/126; 323/229; 323/230
(58) Field of Search ..................... 363/73–98, 123–139; 323/220–252

(56) References Cited

U.S. PATENT DOCUMENTS 5,949,661 A * 9/1999 Minkkinen ................ 363/21.07

FOREIGN PATENT DOCUMENTS

| FR | 2 648 966 | 12/1990 |
| JP | 11-225227 | 8/1999 |
| WO | WO 99/53618 | 10/1999 |

* cited by examiner

Primary Examiner—H. Jey Tsai
(74) Attorney, Agent, or Firm—Lawrence E. Laubscher, Jr.

(57) ABSTRACT

A circuit for lowering the effective voltage drop of a semi-conductor diode. The circuit includes a first Metal Oxide Semi-conductor (MOS) device connected in parallel with the diode. A bias voltage which is close to but lower than the threshold voltage is applied to the MOS device. When a forward voltage is applied to the diode, this voltage is added to the source to drain voltage of the MOS device which turns it on. The MOS device then bypasses the diode to effectively overcome the inherent forward voltage drop of the diode. The circuit is advantageously applied to a rectifier circuit to reduce input voltage requirements and improve the efficiency of the rectifier.

5 Claims, 2 Drawing Sheets

MOS CIRCUIT FOR LOWERING FORWARD VOLTAGE OF DIODES

FIELD OF THE INVENTION

This invention relates to circuits having semi-conductor diodes and more particularly to a system and method of lowering the effective forward voltage drop of semi-conductor diodes.

BACKGROUND

Semi-conductor diodes are used extensively in half wave and full wave rectifier circuits. It is well known that semi-conductor diodes conduct current in a forward direction but substantially no current flows when the diode is reverse bias. Further, in the forward direction current only flows after the applied voltage exceeds a predetermined voltage and this voltage is known as the forward voltage drop. The value of the forward voltage drop is dependent on the material from which the semi-conductor diode is fabricated. The forward voltage drop of a silicon diode, for example, is typically 0.7 volts. It is, of course, known to manufacture diodes by other techniques which may result in a lower forward voltage drop. For example, Schottky diodes have a low forward voltage drop but the process necessary to fabricate Schottky diodes is not always compatible with the process used in manufacturing the integrated circuit incorporating the semi-conductor diode.

There are several applications wherein the input voltage to the circuit is limited and the forward voltage drop of a standard diode may adversely affect the efficiency of the circuit such as, for example, a rectifier circuit.

In the particular application for which a low forward voltage drop is advantageous is an RF-tag circuit. RF tag circuits are used to communicate various forms of information from and to remote locations. These can be active RF tags which automatically transmit information or semi-passive RF tags which are activated or interrogated by another device.

The present invention applies in particular to systems wherein the RF tag is interrogated and in response returns information such as location, temperature, humidity, pressure etc. In such systems the rectifier in the input circuit rectifies incoming data from an external source and extracts from the incoming data the supply voltage (vdd and vss) for the integrated circuit in the RF tag unit.

Obviously, the forward voltage drop can affect adversely is the efficiency of the rectifier circuit. Therefore, there is a need for a system and method to effectively lower the forward voltage drop of diodes used in low voltage environment.

SUMMARY OF THE INVENTION

The present invention provides a simple circuit that can reduce forward voltage drop of diodes and provide thereby increased efficiency and output voltage of a rectifier circuit.

A current reference controls secondary effects of the circuit. The circuit of the present invention is of particular value in integrated circuit fabrication where standard application processes are employed and Schottky diodes are not available.

The invention is also well suited for low voltage and low power applications where the forward voltage of a diode limits the dynamic range.

Therefore, in accordance with a first aspect of the present invention there is provided a circuit for lowering the effective forward voltage drop-of a semi-conductor diode comprising: a first metal oxide semi-conductor (MOS) device connected in parallel with the semi-conductor diode, the MOS device having a set threshold voltage; and a second MOS a device for establishing a bias voltage for the first MOS device, the bias voltage being less than the threshold voltage by a small value.

In accordance with a second aspect of the present invention there is provided a full wave rectifier circuit comprising first and second complementary diodes, each of the diodes having an associated circuit for lowering its effective forward voltage drop, the associated circuit comprising: a first metal oxide semi-conductor (MOS) device connected in parallel with each of the semi-conductor diodes, the MOS device having a set threshold voltage; and a second MOS device for establishing a bias voltage for the first MOS device, the bias voltage being less than the threshold voltage by a small value.

In accordance with a further aspect of the present invention there is provided a method of reducing the effective voltage drop of a semi-conductor diode comprising: connecting a first metal oxide semi-conductor (MOS) device in parallel with the diode, the first MOS device having a predetermined threshold voltage; and generating a bias voltage for the first MOS device, the bias voltage being less than the threshold voltage; whereby input voltage applied to the diode is added to the bias voltage to turn on the MOS device, thereby bypassing the diode.

BRIEF DESCRIPTION OF THE DRAWINGS

The invention will now be described in greater detail with reference to the attached drawings wherein.

DETAILED DESCRIPTION OF THE INVENTION

Figure 1:
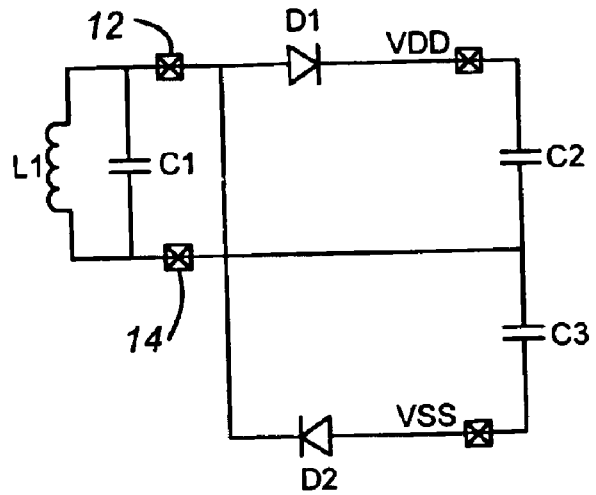
FIG. 1 is a circuit diagram and a prior art rectifier circuit.

FIG. 1 is a circuit diagram of a known full wave rectifier. A positive voltage at terminal 12 causes current to flow through diode D1 after the forward voltage drop has been exceeded. Similarly, a positive voltage at terminal 14 causes current to flow through diode D2 again after the forward voltage drop has been exceeded. As indicated previously this forward voltage drop is dependent on the material used to manufacture the semi-conductor diodes D1, D2 but for a silicon based diode the value is 0.7 volts.

Figure 2:
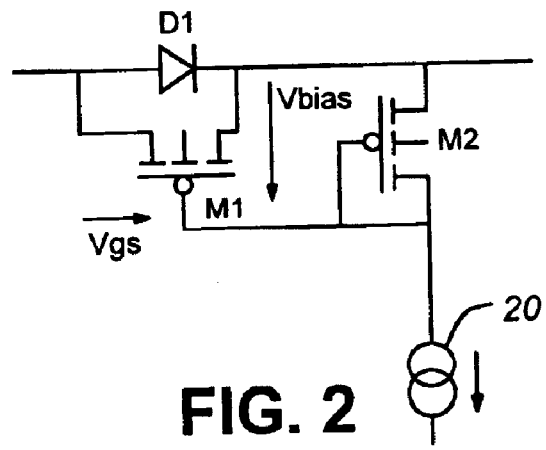
FIG. 2 is a circuit diagram of a single diode with bypass circuitry.

FIG. 2 illustrates the basic implementation of the present invention. In this implementation MOS device M1 having source, drain and gate terminals is connected as shown. The source and drain connections are on either side of diode D1. It is, of course, known that in MOS devices the flow of source to drain current is controlled by the gate voltage. In the implementation of FIG. 2 the gate voltage is biased close to but less than the inherent threshold voltage Vt of MOS device M1. As is known the threshold voltage is the gate to source voltage level at which current flows through the source to drain connections. This bias voltage is derived from MOS device M2 in series with a reference current source is as shown.

When an increasing input voltage is applied to diode D1 icy the value of this voltage is added to the bias voltage bias which very quickly overcomes the threshold voltage and MOS device M1 is turned on. The MOS device M1 now provides a low resistance path in parallel with diode D1 thereby overcoming the forward voltage drop of the diode.

Figure 3:
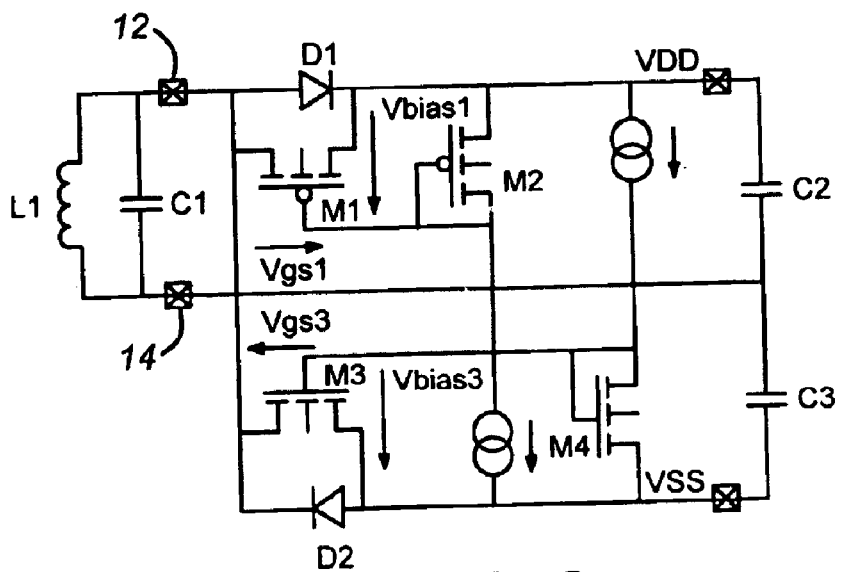
FIG. 3 is a circuit diagram of a full wave rectifier circuit using the circuitry of the present invention.

FIG. 3 illustrates a full wave rectifier circuit comparable to the circuit of FIG. 1 but now incorporating the bypass circuitry of the present invention. In this case complementary metal oxide semi-conductor (CMOS) devices are used in each arm of the rectifier circuit. In the embodiment shown in FIG. 3, MOS devices M1 and M2 provide a bypass circuit for diode D1 when terminal 12 is provided with a position voltage. Similarly MOS devices M3 and M4 provide the bypass circuitry for diode D2 where a position voltage appears at terminal 14. MOS devices M1 and M2 and M3 and M4 respectively operate as current mirrors so that when diodes D1 or D2 are reverse biased the leakage current of each diode is set by the reference current and the current mirror ratio. For a low power application, as in an RF-tag application, this current can be practically negligible. In the circuit of FIG. 3 the reverse leakage current does not load the external resource circuit as their current is only the difference or mismatch in leakage currents between the two complementary circuits.

In an RF tag application the output voltage using the circuitry of the present invention is improved from 1.2 to 1.8 volts. Additionally, there is a much higher loading capacity due to the lower losses in the rectifier.

The diodes D1 and D2 are required in the modified circuit for the initial time period before vdd is high enough to turn on the current reference in the integrated circuit.

Figure 4:
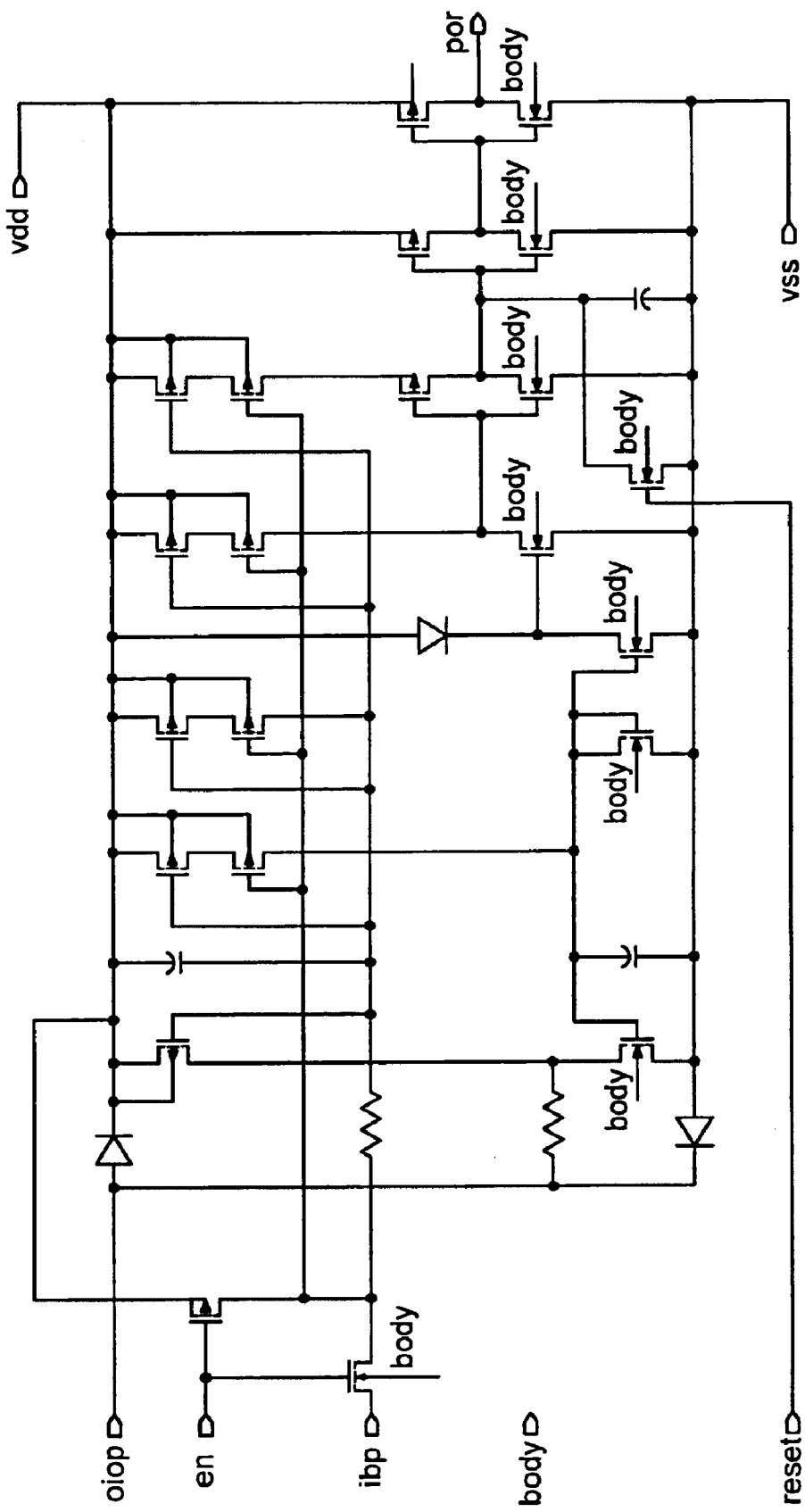
FIG. 4 is a circuit diagram of a RF tag circuit using the forward voltage drop lowering circuit of the present invention.

FIG. 4 is a circuit diagram of an IC implementing an RF tag. As shown on the input side of the circuit the full wave rectifier incorporates the diode bypass circuitry of the present invention.

While a particular embodiment of this invention has been disclosed and illustrated it will be apparent to one skilled in the art that changes can be made to the circuit without substantially altering the basic concept of the invention. Such changes, however, will be encompassed in the full scope of the invention as defined by the appended claims.

What is claimed is:

1. A circuit for lowering the effective forward voltage drop of a semi-conductor diode comprising:

a first metal oxide semi-conductor (MOS) device connected in parallel with said semi-conductor diode, said MOS device having a set threshold voltage; and a second MOS device for establishing a bias voltage for said first MOS device, said bias voltage being less than said threshold voltage by a small value.

2. The circuit as defined in claim 1 wherein said MOS devices each have a source, a drain and a gate connections, said source and drain of said first MOS device being connected in parallel with said diode, and said gate connected to said second MOS device to derive a bias voltage.

3. The circuit as defined in claim 2 wherein said second MOS device is connected to a reference current source.

4. A full wave rectifier circuit comprising first and second complementary diodes, each of said diodes having an associated circuit for lowering its effective forward voltage drop, said associated circuit comprising:

a first metal oxide semi-conductor (MOS) device connected in parallel with each of said semi-conductor diode, said MOS device having a set threshold voltage; and a second MOS device for establishing a bias voltage for said first MOS device, said bias voltage being less than said threshold voltage by a small value.

5. A full wave rectifier circuit as defined in claim 4 wherein complementary metal oxide semi-conductor (CMOS) devices are used in association with said complementary diodes.

* * * * *